Jan. 5, 1943.   H. C. TURNER ET AL   2,307,649
MEASUREMENT OR INDICATION OF THE THICKNESS
OF THIN SHEETS, COATINGS AND THE LIKE
Filed March 31, 1939

INVENTORS
HENRY COBDEN TURNER
EDWARD ARMITAGE FIELDING

Attorney

Patented Jan. 5, 1943

2,307,649

UNITED STATES PATENT OFFICE 2,307,649

MEASUREMENT OR INDICATION OF THE THICKNESS OF THIN SHEETS, COATINGS, AND THE LIKE

Henry Cobden Turner, Manchester, and Edward Armitage Fielding, Oldham, England, assignors to The General Electric Company Limited, London, England Application March 31, 1939, Serial No. 265,358
In Great Britain March 31, 1938

6 Claims. (Cl. 33—147)

This invention relates to the measurement or indication of the thickness of thin sheets, coatings and the like by causing the sheet or the like to form a gap or part of a gap in the magnetic circuit of a transformer to the input of which a standard current is applied and the output of which is associated with a suitable measuring or indicating instrument adapted to give a measure or indication of the thickness of the sheet or the like.

We have found that the sensitivity of the measurement or indication is increased by providing at least one magnetic shunt in the transformer, said shunt being arranged to provide an alternative flux path for at least one of the windings of the transformer.

According to the invention we provide one or more magnetic shunts in the transformer and arrange that the amount of flux carried by the alternative path is dependent upon the thickness of the sheet or the like under test. An air-gap or the equivalent whose length is of the order of the equivalent air-gap in the main magnetic circuit of the transformer may be provided in the said alternative flux path, so that if the air-gap in the main magnetic circuit is increased by an increase in thickness of the sheet or the like under test, the flux through the input coil of the transformer tends to take the alternative path through the shunt. If an alternative path is provided for the output coil of the transformer, flux therethrough will tend to take this alternative path though not for the same reason; thus if the measuring or indicating instrument is of low electrical resistance the alternative path would appear to shunt the stray reluctance elements in the magnetic circuit.

Means are preferably provided for clamping the magnetic shunts in position relatively to the transformer core.

One arrangement of apparatus in accordance with the invention will now be described by way of example with reference to the accompanying drawing. Figure 1 shows a part sectional side view of an exploring head of a layer thickness meter and Figure 2 a central section at right angles to the plane of Figure 1.

Figure 1:
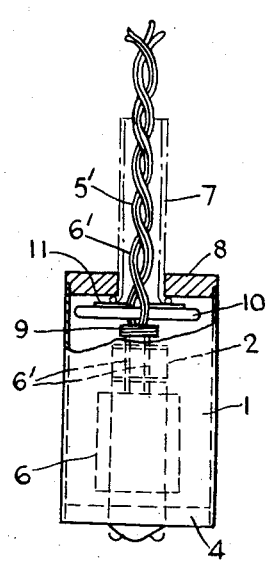
Figure 2:
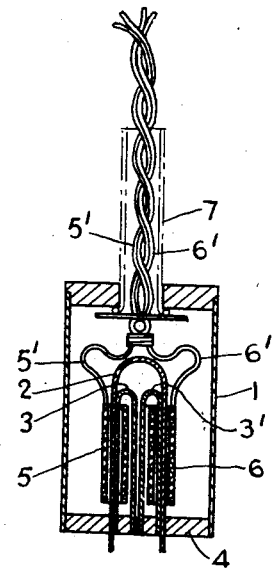
Figure 5:
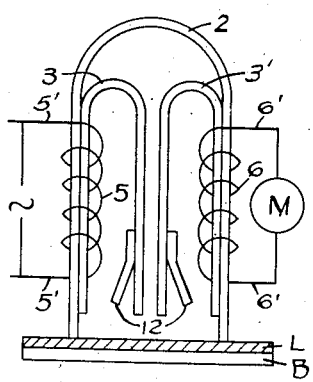
Figs. 4 and 5 are views, similar respectively to Figs. 2 and 3, of a modified form of the invention.

In the drawing, the exploring head comprises a cylindrical metal casing 1 containing a U-shaped transformer core. The core comprises three portions 2, 3 and 3' of thin magnetic strip material. The core 2 forms the main core and the two similar cores 3 and 3', arranged each with one limb in contact with one limb of the main transformer, fit within the larger core; the other two limbs of the inner cores are separated by an air-gap. The cores are maintained in spaced relation by the plug 4 of insulating material fitting within one end of the casing 1, and the limbs of the main core are arranged to project beyond the ends of the inner cores so as to protrude from the plug 4. The ends of the limbs of the main core are shaped to provide three points of support as shown.

The input coil 5 and the output coil 6 are each wound on one limb of the main core and the limb of one inner core in contact therewith.

Connections are made with the coils through leads 5' and 6' which are taken out of the casing through a resilient sleeve 7 fixed in a second plug 8 within the upper end of the casing 1. The leads 5' and 6' are secured by binding 9 and an anchoring pin 10 below the disc 11 so that no undue strain is placed on the connections between the leads and the coils when the exploring head is picked up by the leads.

Figure 3:
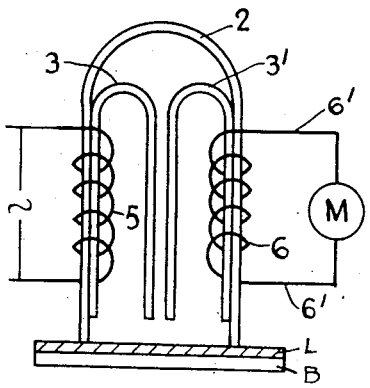
Fig. 3 is a diagrammatic view of the instrument showing the manner in which it is used.
Figure 4:
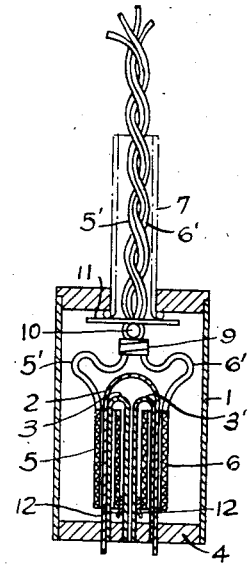

The connections for the transformer and the operation of the instrument will be described with reference to Figure 3 of the accompanying drawing, in which figure the input coil 5 is shown connected up with a substantially constant alternating current supply and the output coil 6 is shown connected to an indicating instrument M. The instrument is indicated in its position to test the thickness of a non-magnetic layer coating, or sheet L on a magnetic base B. When the limbs of the core 2 are in contact with the base B the flux in the outer core 2 will pass through the base to a maximum extent and the indicating instrument M will register a maximum deflection. When the material L is introduced a reluctance is created at each end of the main core 2 and the consequent deflection of the instrument M will be below the maximum depending upon the thickness of the material L. The instrument M may therefore be calibrated in terms of thickness of layers or sheets L.

When the air-gap equivalent to the thickness of the material L is comparable with half the distance between the limbs of the inner core 3, the return path of the flux threading the input coil is shunted by the inner core 3. By adjusting the value of this distance between the ends of the inner core this shunting effect can be controlled. This consideration based on equivalent air-gaps applies equally to the inner core 3' associated with the output coil.

It would appear that the explanation of the effect of embodiment of our invention on the sensitivity of thickness measuring or indicating apparatus may be based on the fact that the measuring or indicating current induced in the output circuit is a function of the mutual inductance between the input and output coils. The mutual inductance is a maximum when the base is in contact with the outer core, and is a minimum when the base is at an infinite distance from the said outer core; that is, the mutual inductance is a maximum when the interlinking flux is a maximum and is zero when this flux is zero. Since the introduction of the magnetic shunt arrangement according to our invention has the effect of diverting the flux, and reducing the interlinking flux to a minimum it would appear that the invention provides means for reducing the mutual inductance to a minimum.

In this case, for small differences of thickness of sheets or the like, large differences of mutual inductance are produced and in consequence large differences of induced currents in the output circuit result. The outcome is that the full scale of the measuring or indicating instrument may be used for measuring or indicating small differences of thicknesses; and greater sensitivity is thereby obtained.

In the modification of the apparatus wherein the gap between the respective inner limbs of the inner cores is arranged to be adjustable, it appears that by this means a control over the mutual inductance may be effected.

We do not however, put forward the above theory as being complete or even accurate; but it appears to us that the theory is reasonable and it aids the explanation of our invention.

Alternatively it may be that the explanation of the increase of sensitivity of the apparatus brought about by the use of our invention is bound up with magnetic reluctance. Thus the indication by the indicating or measuring instrument is dependent upon the value of the magnetic flux in the limb of the core carrying the output coil. A fixed alternating current in the input coil produces a constant alternating magneto-motive force in the magnetic circuit. If the core were massive, the main reluctance would be in the gaps caused by introduction of the sheet or the like to be tested and any change in these gaps will cause the greatest possible change in the flux, a condition to be desired. However, the presence of fixed stray reluctance in the circuit reduces the change in the flux consequent upon a change in the gaps. This stray reluctance may be due (a) to the core consisting of long, thin magnetic members, (b) to lack of constancy of primary current when the gaps vary, and (c) to low impedance of the indicating instrument in the output coil. The presence of suitable magnetic shunts in accordance with the invention would appear to by-pass these stray reluctance elements in the magnetic circuit, thus reestablishing the condition that the main flux change occurs at the gaps caused by introduction of the test sheet or the like. On this theory the absolute indication by the indicating or measuring instrument may be reduced by introduction of the shunts; but it is clear that the proportional rate of varitaion of this indication with change of gap-thickness will be increased in the presence of the shunts.

In addition it may be that, in the particular examples above described, the inner core associated with the output coil fulfills no useful purpose, for we have found that the effect of increased sensitivity may be obtained with the use of one inner shunt or core only, associated with the input coil. But we have obtained better results with apparatus incorporating two inner cores.

In a modification of the construction in accordance with the invention shown in the drawing, the inner limb of each of the inner cores is provided with an extension 12 at an angle to the limb and terminating at a short distance from the outer limb of the respective inner core. The gap between the end of the extension 12 and the outer limb is the control gap above referred to.

In a further modification the two inner cores are arranged in contact with each other, the cores serving to support themselves, if necessary, thus obviating any need for separate supporting means such as the plug 4 in the construction shown in the drawing.

As regards materials, we have found that when it is designed to measure thicknesses of coatings up to about 0.005" on a base of 0.010" or thicker, the cores may be formed conveniently from single strips of mild steel $\frac{1}{16}$" x $\frac{1}{32}$".

Apparatus in accordance with the invention is suitable for use in measuring thicknesses which vary by amounts as low as 0.001" and even as high as $\frac{1}{8}$" though these are not to be taken as limitations of the scope of the invention.

We claim:

1. In an instrument for using a constant current to measure the thickness of thin sheets or the like forming a gap in a magnetic circuit, the combination of a magnetic core forming part of said magnetic circuit, an input coil and an output coil disposed on said core, and means to magnetically shunt a portion of said magnetic core associated with one of said coils, said means having a gap therein.

2. In an instrument for using a constant current to measure the thickness of thin sheets or the like forming a gap in a magnetic circuit, the combination of a magnetic core forming part of said magnetic circuit, an input coil and an output coil disposed on said core, and means to magnetically shunt a part of the flux threading said input coil whereby to prevent said shunted flux from completely traversing said magnetic circuit and threading said output coil, said means having a gap therein.

3. In an instrument for using a constant current to measure the thickness of thin sheets or the like forming a gap in a magnetic circuit, the combination of a magnetic core forming part of said magnetic circuit, an input coil and an output coil disposed on said core, and means to magnetically shunt a portion of said magnetic core associated with one of said coils, said shunting means having a gap therein of the same order as the gap in said magnetic circuit.

4. In an instrument for using a constant current to measure the thickness of thin sheets or the like forming a gap in a magnetic circuit, the combination of a magnetic core forming part of said magnetic circuit, an input coil and an output coil disposed on said core, and means to magnetically shunt a portion of said magnetic core associated with one of said coils, said magnetic shunting means being so constructed and arranged as to provide a gap which may be adjusted to the same order as the gap in said magnetic circuit.

5. In an instrument for using a constant current to measure the thickness of thin sheets or the like forming a gap in a magnetic circuit, the combination of a magnetic member, a magnetic core forming part of said magnetic circuit, an input coil and an output coil disposed on said core, and means to reduce the flux threading the portion of said core associated with one of said coils, said means including a magnetic shunt forming a secondary magnetic circuit between said magnetic member and the portion of said core intermediate said coils, said shunt having a gap therein.

6. In an instrument for using a constant current to measure the thickness of thin sheets or the like forming a gap in a magnetic circuit, the combination of a magnetic member, a magnetic core forming part of said magnetic circuit, an input coil and an output coil disposed on said core, and means to reduce the flux threading the portion of said core associated with one of said coils, said means including a magnetic shunt forming a secondary magnetic circuit between said magnetic member and the portion of said core intermediate said coils, said shunt having a gap therein, said magnetic shunt being so constructed and arranged that the coil associated with the portion of the core in which the flux is reduced is magnetically by-passed.

HENRY COBDEN TURNER.
EDWARD ARMITAGE FIELDING.